US008806638B1

(12) United States Patent
Mani

(10) Patent No.: US 8,806,638 B1
(45) Date of Patent: Aug. 12, 2014

(54) SYSTEMS AND METHODS FOR PROTECTING NETWORKS FROM INFECTED COMPUTING DEVICES

(75) Inventor: SivaShakthivel Mani, Tamil Nadu (IN)

(73) Assignee: Symantec Corporation, Mountain View, CA (US)

(*) Notice: Subject to any disclaimer, the term of this patent is extended or adjusted under 35 U.S.C. 154(b) by 767 days.

(21) Appl. No.: 12/965,075

(22) Filed: Dec. 10, 2010

(51) Int. Cl.
*G06F 21/00* (2013.01)

(52) U.S. Cl.
USPC .................................. 726/24; 726/4

(58) Field of Classification Search
USPC ............................................. 726/24
See application file for complete search history.

(56) References Cited

U.S. PATENT DOCUMENTS

| 2005/0050335 | A1* | 3/2005 | Liang et al. | 713/188 |
|---|---|---|---|---|
| 2005/0144481 | A1* | 6/2005 | Hopen et al. | 713/201 |
| 2005/0283837 | A1* | 12/2005 | Olivier et al. | 726/24 |
| 2007/0143827 | A1* | 6/2007 | Nicodemus et al. | 726/2 |
| 2007/0143851 | A1* | 6/2007 | Nicodemus et al. | 726/25 |
| 2008/0120699 | A1* | 5/2008 | Spear | 726/4 |
| 2009/0064334 | A1* | 3/2009 | Holcomb | 726/24 |
| 2009/0113540 | A1* | 4/2009 | Chandwani | 726/13 |
| 2009/0217346 | A1* | 8/2009 | Manring et al. | 726/1 |
| 2010/0011432 | A1* | 1/2010 | Edery et al. | 726/11 |
| 2010/0043066 | A1* | 2/2010 | Miliefsky | 726/9 |
| 2010/0064341 | A1* | 3/2010 | Aldera | 726/1 |
| 2010/0192196 | A1* | 7/2010 | Lee | 726/1 |
| 2010/0205657 | A1* | 8/2010 | Manring et al. | 726/5 |
| 2010/0242088 | A1* | 9/2010 | Thomas | 726/3 |

OTHER PUBLICATIONS

Symantec, Administration Guide for Symantec™ Endpoint Protection and Symantec Network Access Control, 2007.

* cited by examiner

*Primary Examiner* — Jason K. Gee
*Assistant Examiner* — Maung Lwin
(74) *Attorney, Agent, or Firm* — ALG Intellectual Property, LLC

(57) ABSTRACT

A computer-implemented method for protecting networks from infected computing devices may include providing a computing system with a first level of access to a network. The method may also include determining that the computing system is infected with malware. The method may further include determining that the computing system cannot autonomously neutralize the malware. The method may additionally include modifying by an endpoint management system a network access control policy that controls network access of the first computing system. Various other methods, systems, and computer-readable media are also disclosed.

20 Claims, 12 Drawing Sheets

SYSTEMS AND METHODS FOR PROTECTING NETWORKS FROM INFECTED COMPUTING DEVICES

BACKGROUND

Network computers that are infected with malware may present a threat to other computers on the network. For example, a computer that is infected with a virus may spread the virus to other computers. The virus can be transmitted by e-mail or by any other electronic communication across the network.

In view of the above, conventional network protection systems may shut down a computing device's connection to a network upon detecting that the computing device is infected. For example, a network protection agent running on the computing device may detect that the computing device is infected with malware. The network protection agent may then quarantine the computing device by closing the computing device's network connection. To close the connection, the network protection agent may simply disable the computing device's network card.

Unfortunately, using the conventional systems discussed above may have various drawbacks. One major disadvantage of conventional endpoint network management systems is that quarantined computing devices may not be able to obtain assistance from other nodes on the network. Rather, malware infection at an infected computing device may need to be neutralized manually, and locally, without any assistance across the network. Thus, while a simple quarantine of an infected computing device has the advantage of preventing a computing device from infecting other devices on the network, quarantining the computing device has the disadvantage of isolating it from notes that might provide assistance.

In view the above, the present application discloses systems and methods that may provide the benefit of quarantining the computing device while overcoming one or more disadvantages of the conventional systems discussed above. Numerous further advantages and benefits are achieved in the systems and methods described below.

SUMMARY

As will be described in greater detail below, the instant disclosure generally relates to systems and methods for protecting networks from infected computing devices. Embodiments of the present disclosure may protect computing systems on a network from infection with malware. Embodiments of the present disclosure may also allow an infected computing device to maintain a connection with nodes on the network that may provide assistance in neutralizing the malware. For example, a method for protecting networks from infected computing devices may include: 1) providing a computing system with a first level of access to a network, the computing system being managed by an endpoint management system that controls the computing system's access to the network; 2) determining that the computing system is infected with malware; 3) determining that the computing system cannot autonomously neutralize the malware; and 4) in response to the determining that the computing system cannot autonomously neutralize the malware, modifying by the endpoint management system a network access control policy to alter the computing system's first level of access to the network to a second level of access to the network, the second level providing more limited access to the network than the first level.

Determining that the computing system cannot autonomously neutralize the malware may include 1) executing software by the computing device in an attempt to autonomously neutralize the malware, and 2) determining that the attempt by the software to autonomously neutralize the malware failed. For example, the computing device may execute a diagnostic routine after attempting to autonomously neutralize malware. The diagnostic routine may indicate that the attempt to autonomously neutralize the malware failed.

Determining that the computing system cannot autonomously neutralize the malware may also include 1) setting a flag by the computing device indicating that the attempt by the software to autonomously neutralize the malware failed, and 2) reading the flag by the endpoint management system. The flag may remain set until the malware is neutralized. The flag may alternatively or additionally be set by the endpoint management system.

Altering the computing system's first level of access to the network to a second level of access to the network may include transmitting a firewall policy to the computing system. The firewall policy may restrict the level of access between the computing system and the network.

The firewall policy may deny all incoming and outgoing connections to the computing system except a connection with the endpoint management system. For example, the firewall policy may forbid connections with nodes other than the endpoint management system while allowing information to be downloaded from the endpoint management system. Specifically, in some embodiments, the firewall policy may permit a connection for downloading updated anti-malware definitions from the endpoint management system.

The firewall policy may also, or alternatively, permit a connection for reporting the health of the computing system to the endpoint management system. Reporting the health of the computing system may allow the endpoint management system to determine a threat level at the computing system (i.e., whether the computing system is still infected with malware).

The firewall policy may not permit any application that attempts to access system files of the computing system to access the files. System files may be files designated as system files and/or files that are otherwise important to the functioning of an operating system. Examples of system files include .sys files, the "System suitcase" on Mac OS, and/or any file marked with a "system" attribute.

The firewall policy may not permit the computing system to access a removable device locally attached to the computing system. For example, the firewall policy may prevent the computing system from accessing a printer or scanner locally attached to the computing system. The firewall policy may also prevent the computing system from accessing remote devices such as network printers and scanners.

The endpoint management system may enforce the firewall policy at the computing system until the malware is neutralized. For example, the endpoint management system may enforce the firewall policy until a diagnostic routine shows that the computing system is no longer infected with malware.

In certain embodiments, a system for protecting networks from infected computer devices may include: 1) an access control module programmed to provide a computing system with a first level of access to a network, the computing system being managed by an endpoint management system that controls the computing system's access to the network and 2) a determining module programmed to determine that the computing system is infected with malware and to determine that the computing system cannot autonomously neutralize the malware. The access-control module may be further programmed to, in response to the determining that the computing system cannot autonomously neutralize the malware, modify a network access control policy to alter the computing system's first level of access to the network to a second level of access to the network. The second level may provide more limited access to the network than the first level.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
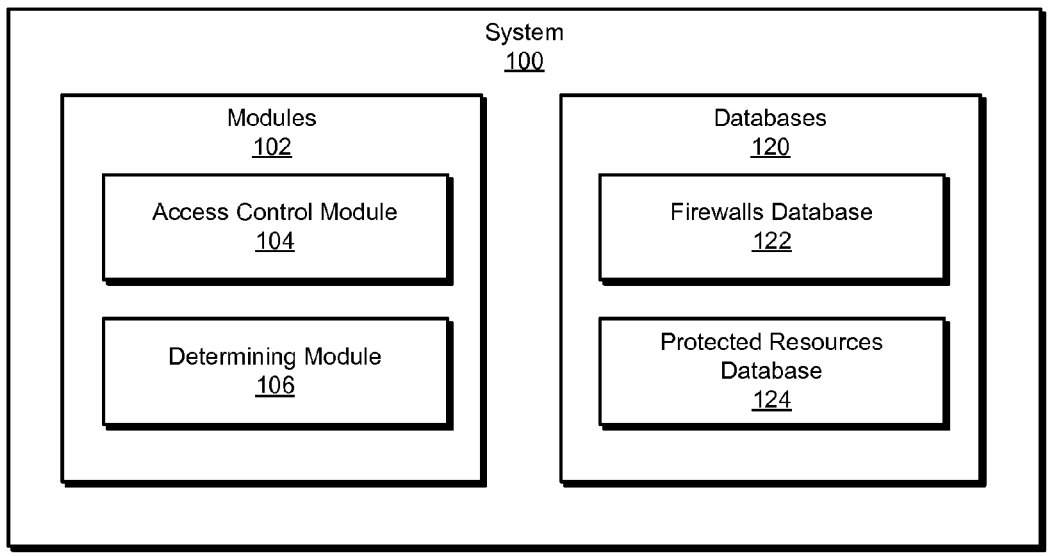
FIG. 1 is a block diagram of an exemplary system for protecting networks from infected computing devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for protecting networks from infected computing devices. In one example, various systems described herein may accomplish this task by providing a computing device with a first network access control policy. These exemplary systems may then determine that the computing system is infected with malware. Accordingly, the systems may attempt to autonomously neutralize the malware. The exemplary systems may determine that the attempt to autonomously neutralize the malware failed. In response to determining that the attempt failed, the exemplary systems may modify the first network access control policy to restrict the level of access between the computing system and the network.

The following will provide, with reference to FIGS. 1-2, 6, and 10, detailed descriptions of exemplary systems for protecting networks from infected computing devices. Detailed descriptions of corresponding computer-implemented methods will also be provided in connection with FIGS. 3 and 7-9. Descriptions of exemplary graphical user interfaces and firewall settings will be provided in connection with FIGS. 4 and 5, respectively. In addition, detailed descriptions of an exemplary computing system and network architecture capable of implementing one or more of the embodiments described herein will be provided in connection with FIGS. 11 and 12, respectively.

FIG. 1 is a block diagram of an exemplary system 100 for protecting networks from infected computing devices. As illustrated in this figure, exemplary system 100 may include one or more modules 102 for performing one or more tasks. For example, and as will be explained in greater detail below, exemplary system 100 may include an access control module 104 for controlling access to a computing network. Exemplary system 100 may also include a determining module 106 for making determinations regarding threats to network computing devices, as discussed more below.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or server 206), computing system 1110 in FIG. 11, and/or portions of exemplary network architecture 1200 in FIG. 12. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a firewalls database 121 for storing firewall policies. Exemplary system 100 may also include a protected resources database 124 for identifying protected, trusted, and/or privileged resources in a network environment.

Databases 120 in FIG. 1 may represent a portion of one or more computing devices. For example, databases 120 may represent a portion of server 206 in FIG. 2, computing system 1110 in FIG. 11, and/or portions of exemplary network architecture 1200 in FIG. 12. Alternatively, databases 120 in FIG. 1 may represent one or more physically separate devices capable of being accessed by a computing device, such as server 206 in FIG. 2, computing system 1110 in FIG. 11, and/or portions of exemplary network architecture 1200 in FIG. 12.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

Figure 2:
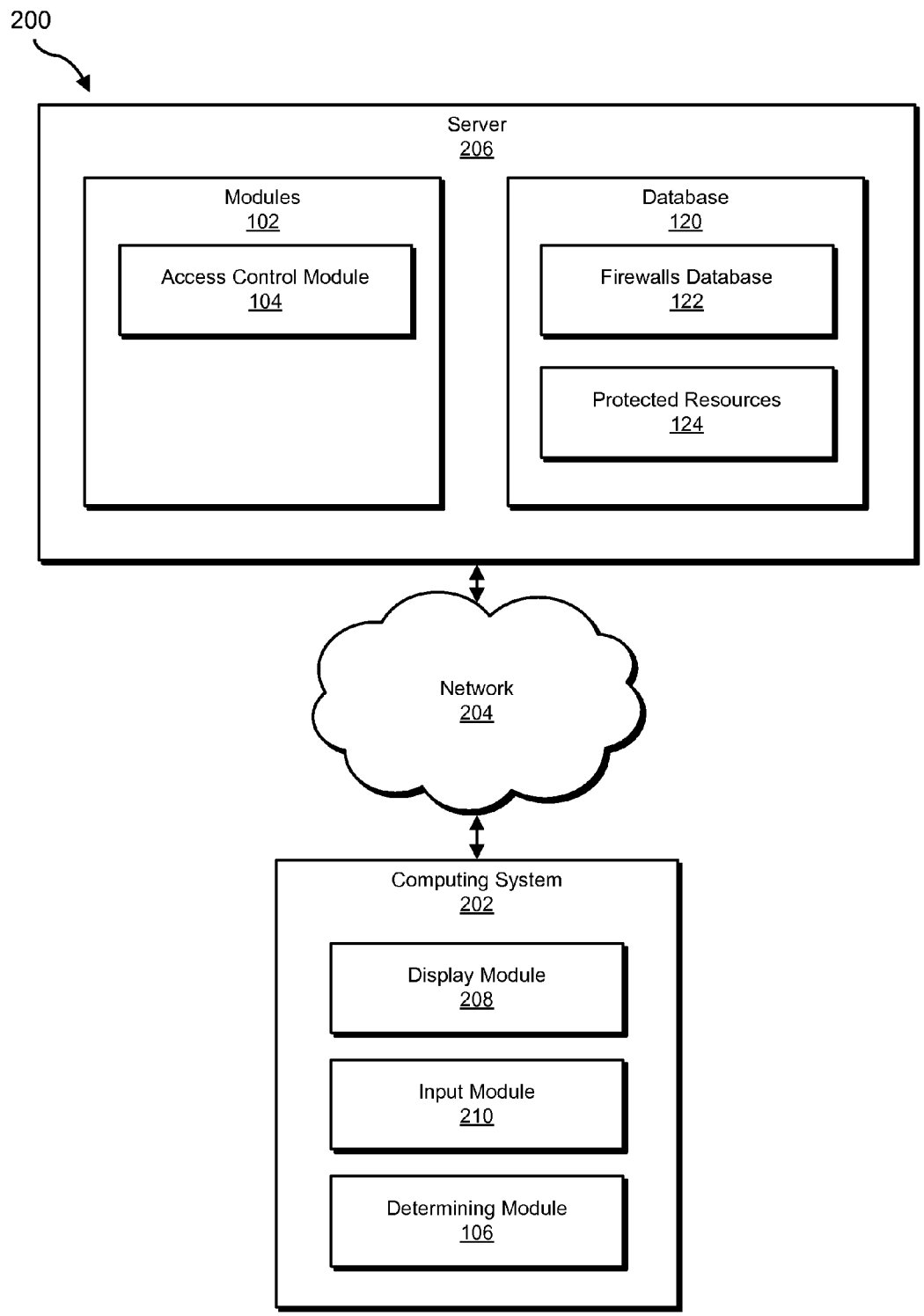
FIG. 2 is a block diagram of another exemplary system for protecting networks from infected computing devices.

As shown in FIG. 2, system 200 may include a computing system 202 in communication with a server 206 via a network 204. In some embodiments, computing system 202 may represent a computing system infected with malware, and server 206 may represent an end-point management server configured to manage computing system 202. In some embodiments, computing system 202 may connect to server 206 to obtain policies and security settings updates, software updates, and/or malware definition updates.

Computing system 202 generally represents any type or form of computing device capable of reading computer-executable instructions. Examples of computing system 202 include, without limitation, laptops, desktops, servers, cellular phones, Personal Digital Assistants (PDAs), multimedia players, embedded systems, combinations of one or more of the same, exemplary computing system 1110 in FIG. 11, or any other suitable computing device. Computing system 202 may include a display module 208 and an input module 210 for performing output and input operations with a user at the computing device, for example. Computing system 202 may also include determining module 106, although determining module 106 may also or alternatively be present at server 206.

Server 206 generally represents any type or form of computing device which, in combination with computing system 202, may perform the methods disclosed in this application. Examples of server 206 include, without limitation, application servers and database servers configured to provide various database services and/or run certain software applications. Server 206 may include access control module 204. Additionally, or alternatively, computing system 202 may also contain one or both of these modules.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 1200 in FIG. 12, or the like. Network 204 may facilitate communication or data transfer using wireless or wired connections. In one embodiment, network 204 may facilitate communication between computing system 202 and server 206.

Figure 3:
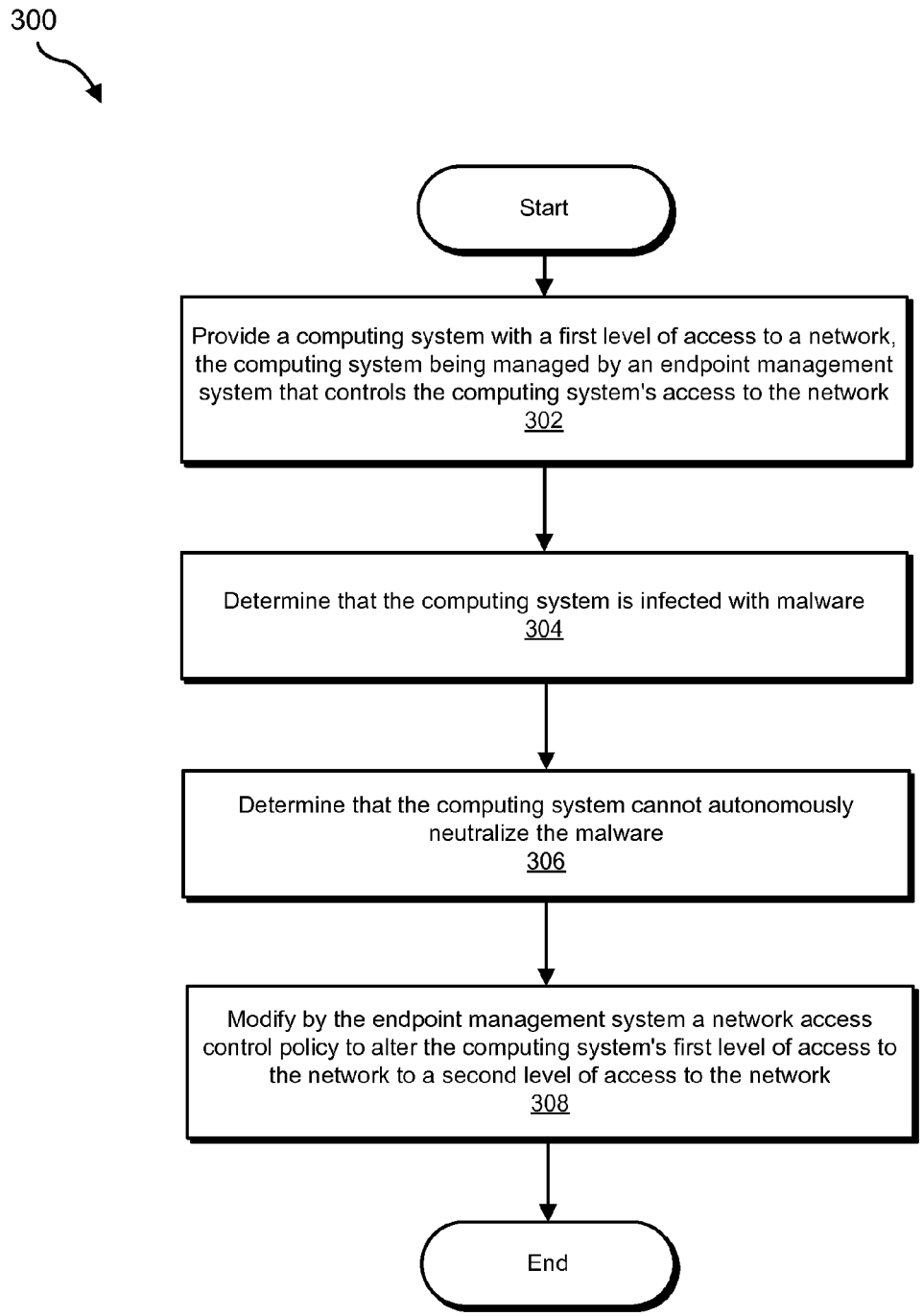
FIG. 3 is a flow diagram of an exemplary method for protecting networks from infected computing devices.

FIG. 3 is a flow diagram of an exemplary computer-implemented method 300 for protecting networks from infected computing devices. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may provide a computing system with a first level of access to a network. The computing system may be managed by an endpoint management system that controls the computing system's access to the network. For example, at step 302, access control module 104 may, as part of server 206, provide computing system 202 with a first level of access to network 204.

Access control module 104 may provide computing system 202 with a first level of access to network 204 in a variety of ways. For example, access control module 104 may provide a network access control policy that indicates one or more network access permissions of computing system 202. The network access control policy may be a security policy of a firewall and/or a policy of any other network access control mechanism. The first level of access to the network may be the level of access provided by a conventional firewall in a corporate or enterprise setting when no malware infection is detected at the computing system. The first level of access may be, therefore, greater than a second level of access discussed more below. Providing a first level of access to the network may more generally include the allowing network communications between computing system 202 and one or more other nodes connected to network 204.

Figure 4:
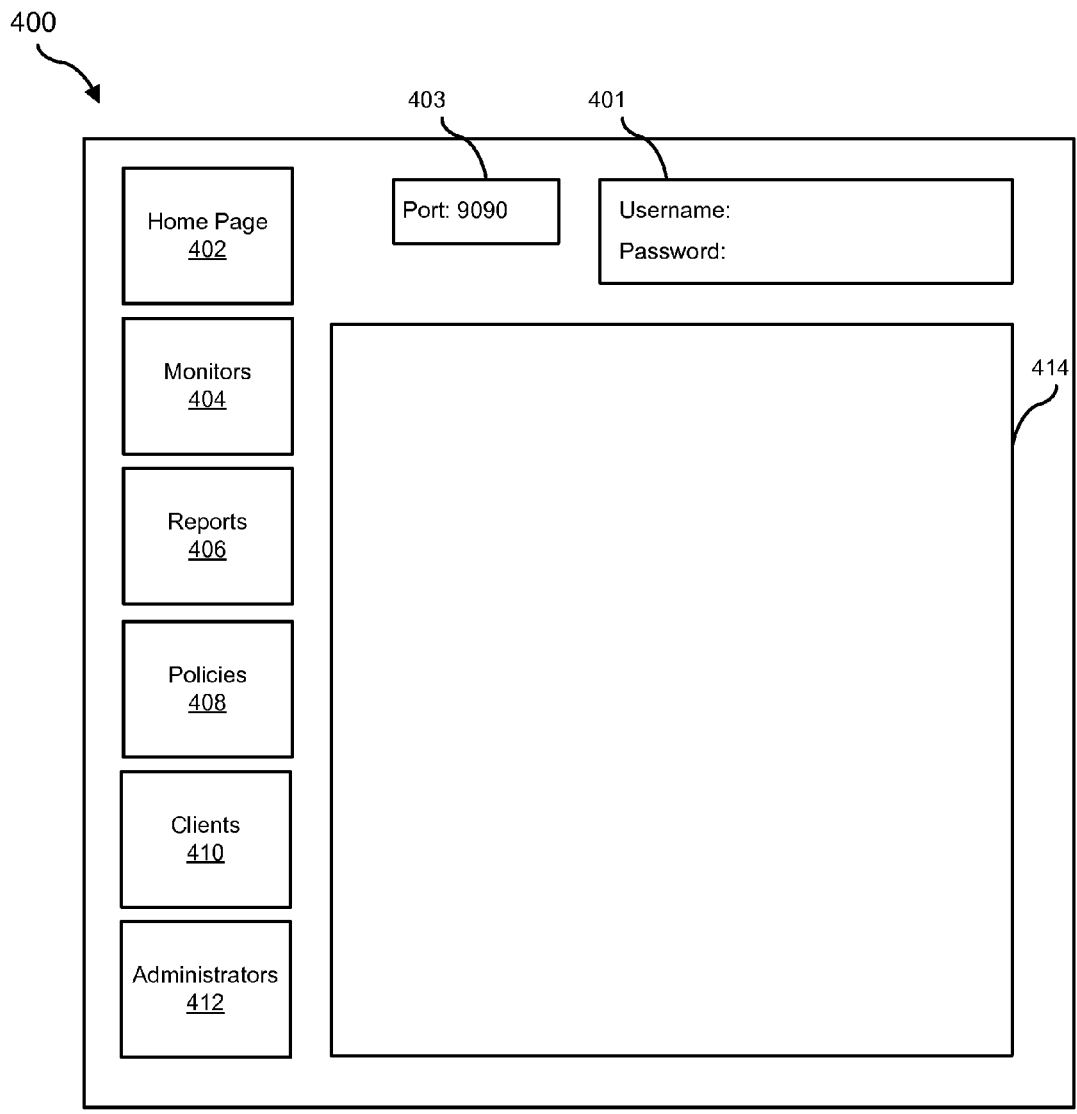
FIG. 4 is a block diagram of another exemplary graphical user interface for an endpoint management system.

In some embodiments, the first level of access may be set by an administrative user. For example, an administrative user may interact with a Graphical User Interface (GUI) of an endpoint point management system to set access control policies for a computing system. FIG. 4 illustrates a block diagram of an exemplary graphical user interface (GUI) 400 of an endpoint management system. A user may log into the endpoint management system using the GUI 400. For example, the user may enter login credentials, such as a username and password, into a credential field 401. The user may login locally (i.e. by logging into server 206 at system 206) or remotely (i.e. by logging into server 206 via computing system 202). The user may login using a computer profile or account (i.e. an account associated with the computing system at which the user is logging in) or a user account (i.e. an account specific to the user).

Using GUI 400, the user may specify a port for communications between an endpoint management server, such as server 206, and endpoints managed by the server, such as computing system 202. The user may specify the port using a port field 403, for example. As shown in FIG. 4, the endpoint management system may include a default port value, such as 9090.

GUI 400 may include several tabs or buttons for accessing different console pages within the endpoint management system. These console pages may include a home page, monitors, reports, policies, clients, and administrators, with respective buttons 402, 404, 406, 408, 410, and 412, as shown in FIG. 4. Selecting one of the buttons may result in the corresponding page and/or corresponding information being displayed in display pane 414.

The home page may display general security status and virus definition summary information. The home page may display attacks detections and/or malware infections, security response information and links, watched applications summary, and/or failed network compliance status of clients. The monitors page may be used to display information from logs, to view and configure notifications, and to view command status. The monitors page may contain the following tabs: summary, logs, command status of commands sent to clients, and/or notifications. The reports page may provide broad overviews of the status of security in a network, such as network 204. The reports may present graphical snapshots of the security events (e.g., attacks, infections, etc.) that occur in the network. The policies page may enable the user to manage network access control policy enforcement, host integrity checking, and automated remediation for all clients.

The clients page may allow a user to manage the computers and users in the network. For example, the clients page may allow a user to add user accounts, import an organizational unit, import users directly from the active directory or an LDAP server, search for clients, and/or find unmanaged computers. The administrators page may enable a user to manage administrator accounts, network domain properties, server properties, and/or client installation packages for the network. The administrators page may show all of the administrators who manage the domain into which the user is logged.

A user may use graphical user interface 400 to select a firewall policy for computing system 202 to designate the first level of network access for computing system 202. Additionally, or alternatively, access control module 104 may automatically set the first level of network access for computing system 202. In some embodiments, the first level of network access for computing system 202 may be a default level of network access.

As noted, in some embodiments the first level of network access for computing system 202 may be designated in a firewall policy. In such embodiments, an endpoint management system (e.g., server 206) may implement a firewall policy by monitoring network traffic to and/or from computing system 206 and may prevent the transmission or packages, messages, or information deemed to violate the policy (e.g. because it is estimated to be unsafe, undesired, inappropriate, burdensome, malware, and/or from a quarantined and/or partially quarantined computing device). The endpoint management system may implement a firewall policy by monitoring some, all or substantially all of the traffic to and/or from computing system 202. A firewall policy may include one or more rules that may be applied to data packets transmitted, or attempted to be transmitted, across the network.

Figure 5:
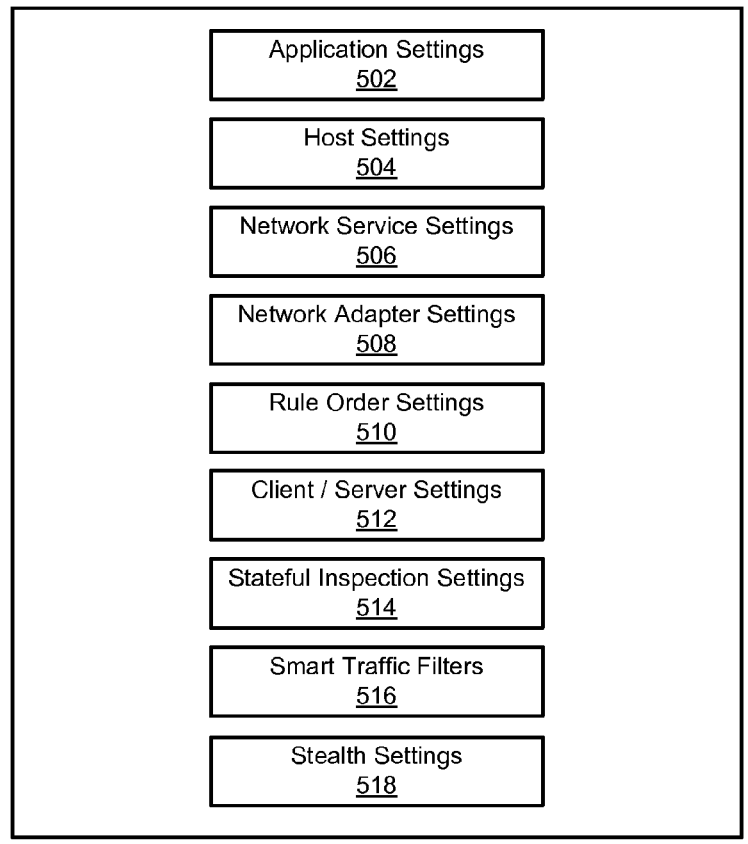
FIG. 5 is a block diagram of exemplary firewall settings.

A firewall policy may contain various settings, including triggers. FIG. 5 shows a block diagram of exemplary settings 500 for a firewall. Application settings 502 may designate firewall triggers relating to particular applications or kinds of applications. For example, application settings 502 may designate a more restrictive rule for web browser applications than for file sharing applications. Host settings 504 may designate firewall triggers relating to whether a packet is being transmitted to or from a particular host or kind of host. For example, host settings 504 may define firewall triggers in terms of the source and/or destination of the packet, or in terms of the local and/or remote host for the packet. Network service settings 506 may designate firewall triggers in terms of a network service carrying the packet, such as TCP, UDP, ICMP, IP, and/or Ethernet. Network adapter settings 508 may designate firewall triggers in terms of a network adapter used to transmit or receive the packet, including Ethernet, wireless, dial-up, VPN, and/or vender-specific virtual adapters.

In addition to the triggers discussed above, firewall settings 500 may also designate, in the form of rule order settings 510, an order or priorities for processing items in a network access control policy. For example, rule order settings 510 may designate the following priority for processing items (from first to last): custom intrusion prevention signatures (IPS); intrusion prevention settings, traffic settings and stealth settings; smart traffic filters; firewall rules; port scan checking; and IPSs that are downloaded through the endpoint management server. That order is merely exemplary, however, because any item may be reordered, replaced, and/or omitted based on the preferences of the user, for example.

A group (i.e. of computers and/or users) managed by the endpoint management system may inherit firewall settings from a parent group from which the group depends. In that case, a user and/or access control module 104 may designate whether the parent or subgroup rules take precedence (i.e. in order of execution or in event of conflict).

Firewall rules may be designated server-side and/or client-side. Firewall settings 500 may include client/server settings 512 that designate whether firewall rules may be controlled by the server, client, or both. In other words, the firewall rules and settings discussed herein may be implemented by a client-side firewall and/or a server-side firewall (e.g., a network firewall). An administrator and/or access control module 104 may also designate priorities between server and client firewall rules.

Firewall settings 500 may also include stateful inspection settings 514. Stateful inspection may track information about current connections such as source and destination IP addresses, ports, and applications. That information may form a basis for determining whether to allow or block a packet (i.e. in combination with the other triggers and settings mentioned above). For example, stateful inspection settings 514 may indicate that, when outbound traffic on Telnet (port 23), HTTP (port 80), and/or HTTPS (port 443) is permitted, then inbound traffic on that port in response may also be permitted. This may reduces or eliminates the requirement for inbound firewall rules in those scenarios.

Firewall settings 500 may also include smart traffic filters 516. These filters may allow communication between certain network services so that the user or administrator does not have to define the rules that explicitly allow those services. These rules may allow traffic (i.e. outbound requests and inbound replies) for DHCP, DNS, and/or WINS.

Firewall settings 500 may also include stealth settings 518. These settings may enable the detecting and blocking of traffic that communicates through drivers, NetBIOS, and/or token rings. Stealth settings 518 may also enable/disable reverse DNS lookup, anti-MAC spoofing, stealth mode Web browsing, TCP resequencing, and/or OS fingerprint masquerading.

An administrator may select or designate any combination or permutation of triggers and/or rules, such as those described regarding FIG. 5, to define firewall rules and/or policies for specific computers and/or specific connections between computers. The administrator may define these rules or policies using a graphical user interface for the endpoint management system, such as GUI 400. The administrator may then apply those firewall policies and/or rules to one or more computers, users, and/or or groups of computers and/or users. The firewall policies and/or firewall rules may also be imported, exported, edited, deleted, copied, pasted, enabled, and/or disabled, such as by using GUI 400.

At step 302, access control module 104 may provide a first level of access for the computing system by providing or designating a first firewall policy as described above. The firewall policy may be selected as appropriate for a corporate or enterprise context in the case that no (or substantially no) malware infection is known to be present at the computing system.

To determine whether the first firewall policy is appropriate for a particular computing system, the level of infection or threat at the computing system may be measured using one or more metrics. Then determining module 106 may determine whether the measured level at the computing system achieves a designated threshold. Systems that do not achieve the threshold may receive the first firewall policy. The threshold may be a minimal level because corporations and enterprises often do not wish to tolerate any malware on their network. Alternatively, the threshold level may be any level designated by the system administrators.

For example, triggers and/or settings for the first firewall policy may be selected that are more liberal in allowing traffic to and from the computing system than a second firewall policy. The second firewall policy may be selected or appropriate for a corporate or enterprise context in which a malware infection is known to be present at the computing system. The first firewall policy may serve as a default firewall policy in the case that a malware or threat level at a computing system is not known.

Figure 6:
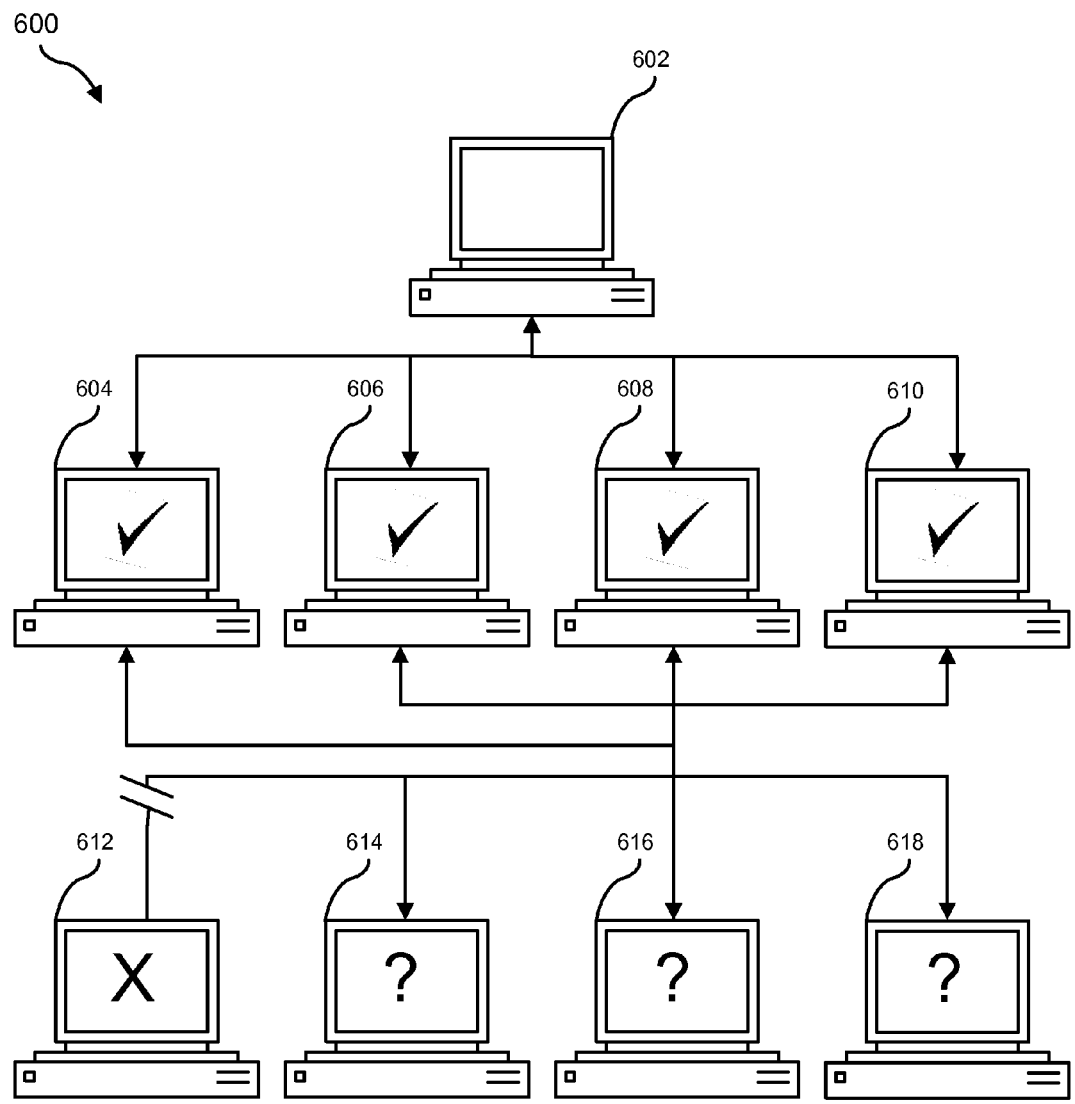
FIG. 6 is a diagram of an exemplary network featuring an endpoint management system.

FIG. 6 illustrates a diagram of an exemplary computer network 600 featuring an endpoint management system. The network 600 includes an endpoint management server 602, which may correspond to server 206, that manages endpoint computing systems 604, 606, 608, and 610. Further, computing system 606 may also be connected to computing systems 612, 614, 616, and 618 across the network, although computing systems 612-618 are not managed by server 602.

A user or administrator may locally or remotely designate, or access control module 104 (which may reside in any of the systems shown in FIG. 6) may designate, a firewall policy for computing system 608. FIG. 6 illustrates a scenario in which there is no known threat or malware infection at computing system 608. Accordingly, the firewall policy designated for computing system 608 may be a first or default firewall policy, as described above. As shown in FIG. 6, the first firewall policy may allow traffic between computing system 608 and the other computing systems 604, 606, and 610 that are managed by server 602, and which happen to be known by server 602 to be (substantially) safe or free from malware. The lack of known threats at computing systems 604-610 is indicated by the checks over those systems in FIG. 6. The first firewall policy may also allow traffic between computing system 608 and other computing systems that are not managed by server 602 and that are not known to be infected with malware (e.g., above a threshold level), such as computing systems 614-618. The question mark over these computing systems may indicate that they are not known to be infected with malware.

Lastly, the first firewall policy may be enforced to block traffic in one or both directions between computing system 608 and a remote computing system, such as computing system 612, known to be infected with malware. The "X" over computing system 612 indicates that the computing system is known to be infected with malware. Further, the double line break in the connection between computing system 608 and computing system 612 indicates that the first firewall policy governing system 608 blocks traffic between those systems.

Returning to FIG. 3, at step 304 one or more of the systems described herein may determine that the computing system is infected with malware. For example, at step 304, determining module 106 may determine that computing system 202 is infected with malware. Computing system 202 and/or an endpoint management server may set a flag upon detecting that the computing system is infected with malware. Such a flag may be read by an endpoint management system when determining whether to modify network access rights of computing system 202, as discussed in greater detail in connection with step 308.

Determining module 106 may determine that computing system 202 is infected with malware in a variety of ways that may generally be divided into two categories: 1) detecting diminished system performance without detecting explicit evidence of malware and 2) detecting explicit evidence of malware. Diminished system performance may include, for example, slower processing or disk access, or greater processor or disk utilization, as well as a greater number of shutdowns, errors, and/or blue screens. Explicit evidence of malware may include evidence of files and/or settings created or generated by malware, evidence of files and/or settings placed into a state by malware that implicates the malware, and/or evidence of malware files themselves (e.g., a hash or fingerprint of a file on computing system 202 may match a hash or fingerprint of a known malware file). The evidence may implicate a particular species or strain of malware, a general family of malware, a class or type of malware, and/or may simply implicate malware in general. Diagnostic routines (e.g., malware scans using a set of malware signatures) may perform tests to determine whether the computing system is infected with malware using either explicit or implicit evidence of malware. These diagnostic routines may also be specific to a particular species, strain, family, class, and/or type of malware by searching for particular evidence that is generated by that particular malware and/or that uniquely identifies, or tends to identify that malware.

Figure 7:
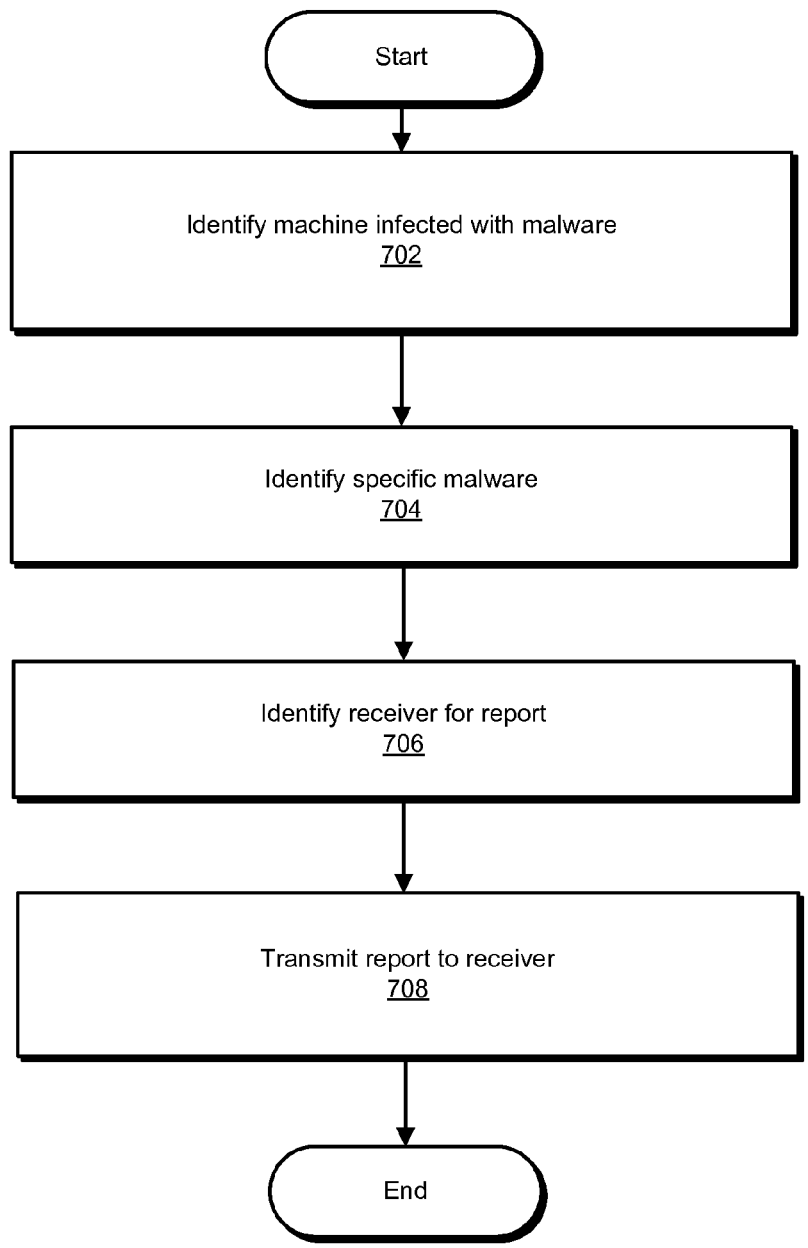
FIG. 7 is a flow diagram of an exemplary method for reporting interactions with inappropriate digital content.

FIG. 7 illustrates a flow diagram of one exemplary method for determining that the computing system is infected with malware. At step 702, a user and/or determining module 106 may identify a particular machine that may be infected with malware. The user may designate the machine in a graphical user interface, such as GUI 400. Additionally, or alternatively, determining module 106 may detect that a particular machine shows evidence of malware using one or more of the malware detection algorithms or heuristics described above.

At optional step 704, an administrative user and/or determining module 106 may identify the specific malware that infected the computing system. For example, upon detecting sluggish performance at the computing system in step 702, the user and/or determining module 106 may run diagnostic routines to determine the identity of the malware as nearly as practicable. In one example, the diagnostic routines may scan the computing system for evidence of a wide variety of strains, families, and/or types of malware in a database of such evidence.

At step 706, an administrative user and/or determining module 106 (or another module in system 100) may identify a recipient (e.g., an end-point management system) of a report indicating that the computing system is infected with malware. The user may designate the recipient using a graphical user interface, such as GUI 400 (i.e. by typing an email address). Determining module 106 may identify the recipient according to default settings or report settings designated in an endpoint management system. At step 708, determining module 106 may transmit the report to the receiver identified at step 706.

Returning to FIG. 3, at step 306, one or more of the systems described herein may determine that the computing system cannot autonomously neutralize the malware. For example, determining module 106 may determine that computing system 202 cannot autonomously (i.e., without assistance from a remote system) neutralize malware found on computing system 202. Determining module 106 may perform step 306 in a variety of ways. For example, determining module 106 may attempt to remove and/or neutralize one or more infected files or other malware files, but may fail to completely eliminate the malware. Upon failing to eliminate the malware, determining module 106 may determine that computing system 202 cannot autonomously neutralize the malware. In other embodiments, determining module 106 may determine that computing system 202 cannot autonomously neutralize the malware without first attempting to neutralize the malware (e.g., by determining that computing system does not have the requisite software tools to remove the particular type of malware detected).

Figure 8:
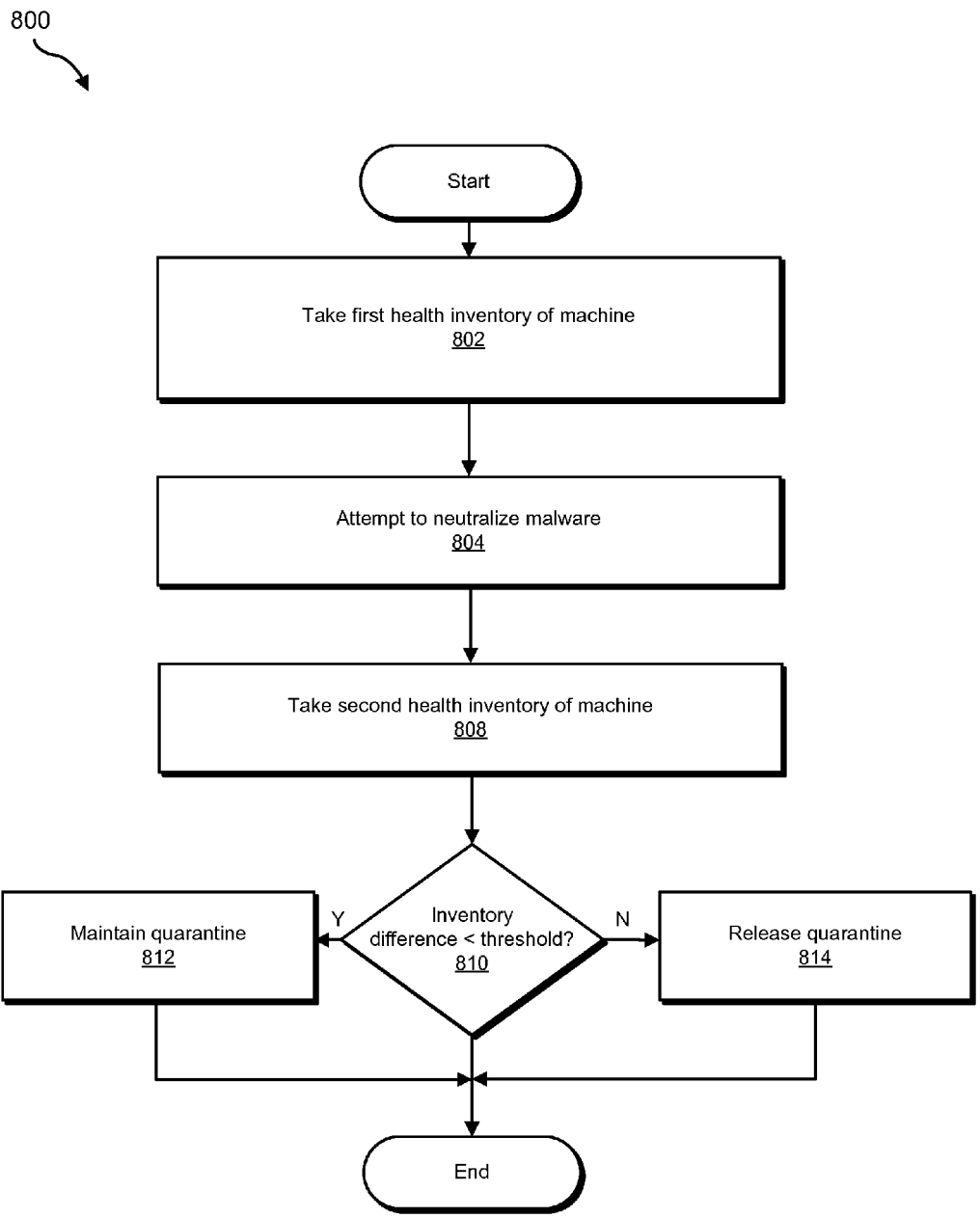
FIG. 8 is a flow diagram of an exemplary method for reporting interactions with inappropriate digital content.
Figure 9:
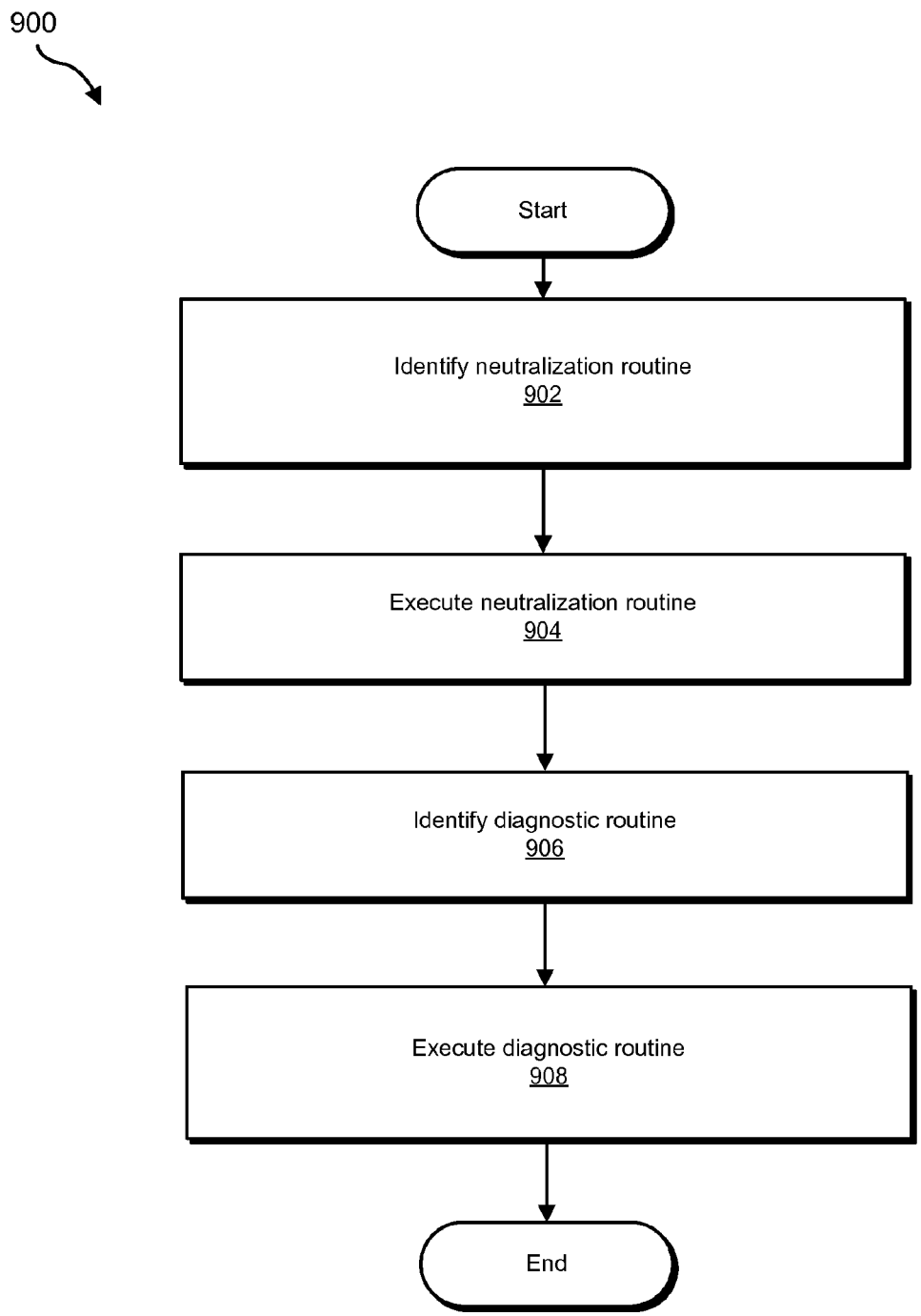
FIG. 9 is a flow diagram of an exemplary method for reporting interactions with inappropriate digital content.
Figure 10:
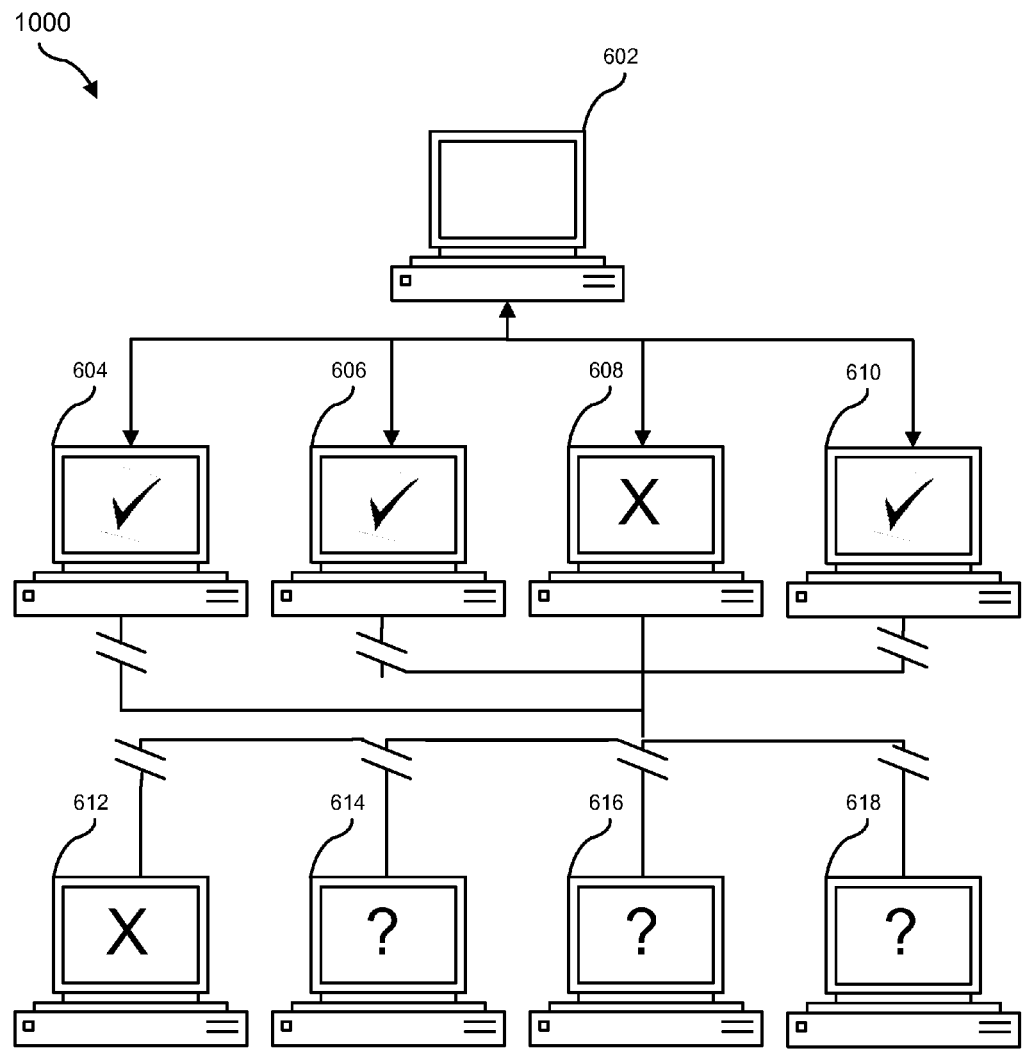
FIG. 10 is a diagram of an exemplary network featuring an endpoint management system.

Other examples of determining that a computing system cannot autonomously neutralize malware are shown in FIGS. 8-10. FIG. 8 illustrates a flow diagram of a first exemplary method for determining that a computing system cannot autonomously neutralize the malware. At step 802, determining module 106 may take a first health inventory of the computing system. Taking the health inventory may include any measurement that tends to indicate the relative health, degree of functioning, or degree of threat or infection of the computing system. The health inventory may be based on factors including the factors discussed above regarding FIG. 7 (i.e. the processing or disk access speed and/or a number of errors), as well as the results of diagnostic routines and/or scanning for evidence of malware (e.g., malware signature-based scans).

At step 804, access control module 104 may attempt to neutralize the malware. Access control module 104 may attempt to neutralize the malware in any suitable manner. For example, access control module 104 may attempt to remove, replace, clean, quarantine, and/or otherwise neutralize one or more files associated with the malware.

At step 808, determining module 106 may take a second health inventory of the computing system. The second health inventory may measure the same items, using the same metrics, as in the first health evaluation. The use of the same measure may ease the comparison between the two inventories at decision block 810 discussed below. Alternatively, the second health inventory may measure slightly, substantially, or entirely different items, using the same or different metrics. Determining module 106 may then account for these differences in comparing the health inventories at decision block 810.

At decision block 810, determining module 106 may compare the first and second health inventories. Determining module 106 may compare the health inventories to determine whether the health of the computing system improved, or substantially improved, after the completion of the attempt to neutralize the malware. For example, determining module 106 may compute a difference between the first health inventory and the second health inventory. Determining module 106 may then determine whether the difference indicates an improvement sufficient to achieve a designated threshold. If the difference is less than the designated threshold, determining module 106 may maintain the quarantine on the infected device (step 812). If the difference is more than the designated threshold, determining module 106 may release the quarantine on the infected device (step 814).

FIG. 9 illustrates a flow diagram of another method 900 for determining that a computing system cannot autonomously neutralize malware. At step 902, a user and/or determining module 106 may identify a neutralization routine. The neutralization routine may be identified based on its known relationship to or potential to neutralize the malware previously identified (i.e. at step 304). At step 904, determining module 106 may execute the neutralization routine identified at step 902.

At step 906, a user and/or determining module 106 may identify a diagnostic routine. The diagnostic routine may be the same routine as used to identify the malware infection at step 304. Alternatively, the diagnostic routine may be a routine to verify that the neutralization routine executed at step 904 succeeded in making the specific file and/or settings changes to which the neutralization routine is directed. Similarly, the diagnostic routine may be a routine that determines whether a file, data structure, or other code (e.g., code injected in a good file) associated with the malware is still present on the computing system, even if in a dormant state. The diagnostic routine may also determine whether files and/or settings associated with the malware have reappeared after being removed by the neutralization routine.

At step 908, the determining module may execute the diagnostic routine identified at step 906. The diagnostic routine may then report whether the malware was successfully removed and/or is still present, or is likely to still be present, on the computing system.

In contrast to using a diagnostic routine as discussed above regarding FIG. 9, determining module 106 may also, or alternatively, determine that the attempt to neutralize the malware failed if the neutralization routine itself reports a failure, fails to complete, or if the computing system shuts down, reboots, and/or restarts during the routine. Determining module 106 may then determine whether to attempt to execute the diagnostic routine again or whether to infer that the computing system cannot autonomously neutralize the malware (e.g. after a sufficiently large or predetermined number of failed attempts to execute the neutralization routine).

Upon determining that computing system 202 cannot autonomously neutralize the malware, the computing system 202 may set a flag indicating that computing system 202 is unable to neutralize the malware. Such a flag may be read by an endpoint management system when determining whether to modify network access rights of computing system 202, as discussed in greater detail below.

Returning to FIG. 3, at step 308 one or more of the systems described herein may modify a network access control policy to alter the computing system's first level of access to the network to a second level of access to the network. The second level of access may be more limiting than the first level. For example, at step 308, access control module 104 may modify a network access control policy associated with computing system 202 to alter computing system 202's first level of access to the network to a second level of access to the network.

Access control module 104 may modify the network access control policy associated with computing system 202 in response to any suitable trigger. For example, access control module 104 may periodically check one or more flags to determine whether computing system 202 is infected with malware and/or whether computing system 202 cannot autonomously neutralize malware. If such a flag is set, access control module 104 may respond by modifying the network access control policy associated with computing system 202.

Access control module 104 may perform step 308 in a variety of manners. For example, access control module 104 may apply a second firewall policy the computing system 202. The second firewall policy may be more limiting than the first firewall policy discussed above regarding FIG. 6. The second firewall policy may effectively quarantine computing system 202 from any computing system that may be vulnerable to infection from the infected computing system while maintaining a connection, or limited connection, to the endpoint management server. The second firewall policy may also limit the connection to the endpoint management system based on the known or estimated vulnerability of the endpoint management system to infection from the computing system. For example, if the endpoint management system is not known to be immune to infection, then the second firewall policy may maintain a very limited connection to the computing system. The limited connection may limit the computing system's ability to transmit messages to the endpoint management system to specific, pre-approved messages controlled by the endpoint management system (and/or an agent for the system executing at the computing system). The limited connection may also allow a remote user to operate some or all of the functionality at the infected computing system using a graphical user interface (i.e. a remote access interface) so as to attempt to repair the system and/or neutralize the malware.

FIG. 10 illustrates another diagram of the network environment featuring an endpoint management system previously shown in FIG. 6. The view in FIG. 10 shows a scenario in which computing system 608 is known to be infected with malware, as indicated by the "X" over the computing system, as discussed above regarding step 304. Further, it is also known (i.e. by a determining module at server 602) that the computing system cannot autonomously neutralize the malware, as discussed above regarding step 306.

In view of the above, access control module 104 at server 602 and/or computing system 608 (or another remote system connected to system 608) has applied a second firewall policy at computing system 608. The second firewall policy may replace a first firewall policy, as discussed above regarding FIG. 6, may be the first firewall policy to be applied to computing system 608 (i.e. the system was previously exposed), and or may be a modified version of a first firewall policy.

As shown in FIG. 10, the second firewall policy may effectively quarantine computing system 608 from computing systems that may be vulnerable to infection. Thus, even though computing systems 604, 606, and 610 are known to be free from malware, the second firewall policy may block some, all, or substantially all traffic between those systems and infected computing system 608. Similarly, the second firewall policy may also block some, all, or substantially all traffic between infected computing system 608 and computing systems 612-618. The double lines breaking the connections between these computing systems in FIG. 11 indicate that the second firewall policy is blocking traffic.

Although the second firewall policy may block traffic between computing systems, as discussed above, the second firewall policy may also maintain an open or limited connection (i.e. allow at least some traffic) between infected computing system 1108 and endpoint management server 1102, as discussed above. Indeed, the second firewall policy may maintain an open or limited connection between the infected computing system and any other designated or identified computing system. These computing systems may be computing systems that are less valuable to the administrators of the endpoint management system so that they can be used as test cases or experiments, or otherwise be exposed to malware for the administrators' purposes. The computing systems may also be computing systems that are known to be able to provide assistance to the infected computing system (e.g. updated anti-malware definitions or neutralization routines), such as endpoint management server 602. These computing systems may be identified in a database, such as protected resources database 124. Database 124 may also specify a degree of infection, vulnerability, assistance ability, and/or connection, and all of these may be factors on which the second firewall policy is selected or built, as discussed more below.

Server 602 may transmit the second firewall policy to computing system 608. Additionally, or alternatively, server 602 may transmit an instruction to computing system 608 to apply a firewall policy already present, but inactive, at computing system 608. Alternatively, access control module 104 may be present at computing system 608 and may autonomously decide to apply a local firewall policy, or request the second firewall policy from a remote location, without intervention from server 602.

The second firewall policy may deny traffic or access between computing system 608 and any other computing system except for server 602. In maintaining a connection with server 602, the second firewall policy may permit computing system 608 to report its health to server 602. The second firewall policy may also permit computing system 608 to download updated anti-malware definitions or neutralization routines from server 602. The second firewall policy may limit the connection between computing system 608 and server 602 to only, or substantially only, the functions of reporting the health of computing system 608, the downloading of updated anti-malware definitions and neutralization routines, and/or other limited functions that assist computing system 608 in neutralizing the malware and/or protecting the network. Unlike the first firewall policy discussed above, the second firewall policy may default to blocking traffic between the computing system where it is applied and any other computing system which has an unknown state of infection or an unknown state of vulnerability to infection (or known infection or vulnerability).

The second firewall policy may block access by any application to system files. System files may be files designated as system files and/or files that are otherwise important to the functioning of an operating system. Examples of system files include .sys files, the "System suitcase" on Mac OS, and/or any file marked with a "system" attribute. The second firewall policy may make exceptions so that pre-approved or designated application may access system files.

The second firewall policy may block access by the infected computing system and/or all computing systems to removable devices locally attached (or remotely connected) to the infected computing system. The second firewall policy may also make exceptions for pre-approved or designated applications to access these devices.

Access control module 104 may maintain the application of the second firewall policy until the malware is known to be neutralized. At that time, the second firewall policy may be deactivated at the computing system and a different network access control policy (i.e. the first firewall policy) applied or renewed.

The second firewall policy may be selected by access control module 104 from a database of firewall policies, such as firewalls database 122. Access control module 104 may select the second firewall policy based on factors including the estimated degree of infection of any and/or each computing system affected by the firewall policy (i.e. the computing system where the policy is applied and all systems connected to it), the estimated degree of vulnerability to infection of any and/or each computing system affected by the firewall policy, the nature of the malware as best identified, and/or the estimated degree of effectiveness of any and/or each trigger or setting within the firewall policy in neutralizing or quarantining the identified malware. The triggers, rules, types of blocked packets, and/or degree of connectivity between the infected computing system and any other computing system may be tailored for, and specified by, the second firewall policy, based on these factors. The second firewall policy may also be built or created by access control module 104, instead of being selected from a database, by designating triggers and/or settings, such as those discussed above regarding FIG. 5, based on any or each of the factors identified in the preceding paragraph.

In the above discussion, an endpoint management system server, such as server 1102, may generally determine that the computing system cannot autonomously neutralize the malware. The server may then transmit the second firewall policy to provide a limited quarantine of the infected computing system, thereby protecting the network from further infection. Alternatively, and as discussed above, all of the modules of system 100 and the functionality of applying the second firewall policy based on the above-described determinations may be performed by the infected computing system itself without cooperation from an endpoint management server.

Thus, an infected computing system may autonomously determine that it cannot neutralize malware and thereby apply a more limiting firewall policy, or request, receive, and then apply a more limiting firewall policy.

Figure 11:
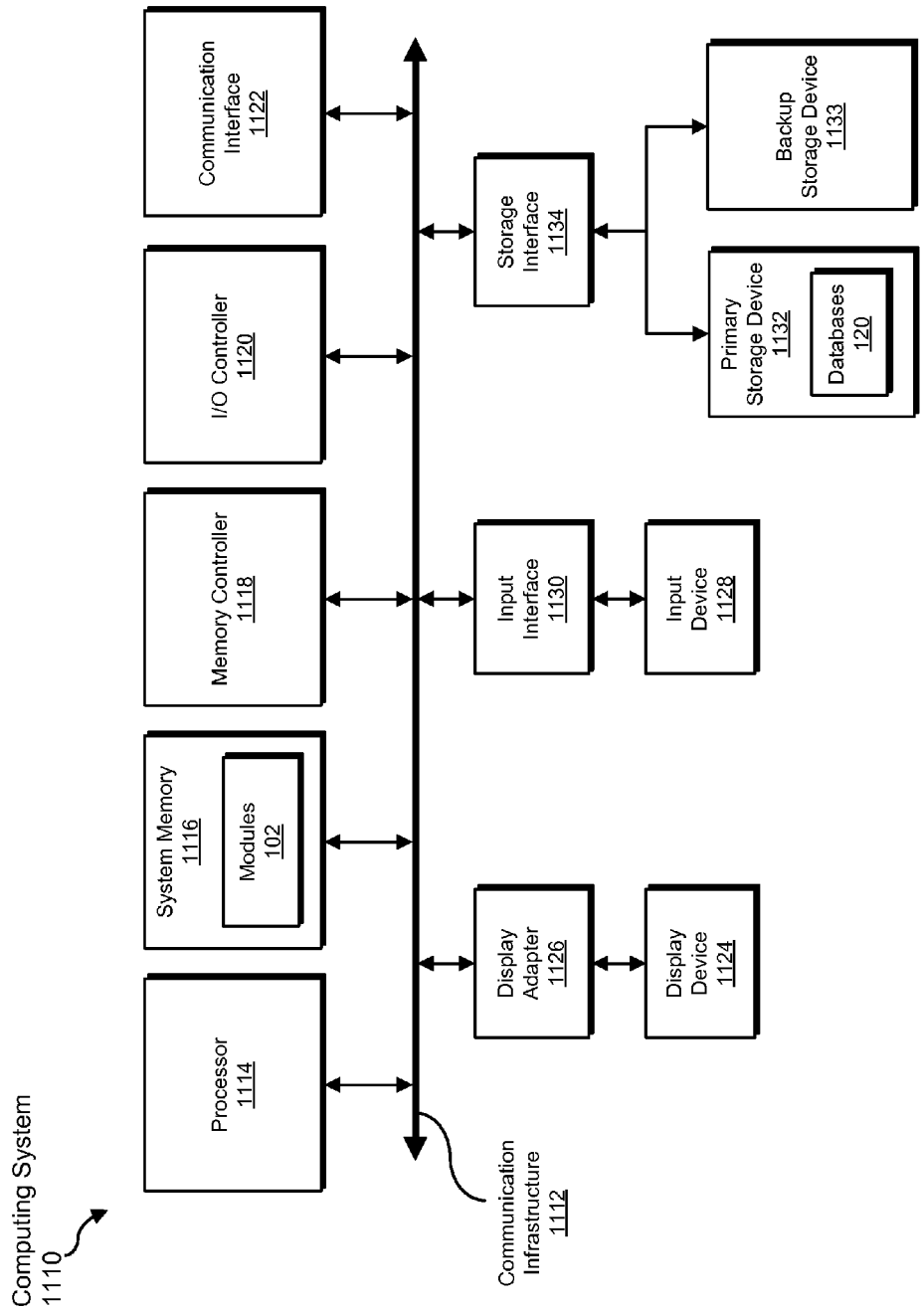
FIG. 11 is a block diagram of an exemplary computing system capable of implementing one or more of the embodiments described and/or illustrated herein.

FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the providing, determining, executing, setting, reading, altering, denying, permitting, and/or enforcing steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In certain embodiments, exemplary computing system 1110 may also include one or more components or elements in addition to processor 1114 and system memory 1116. For example, as illustrated in FIG. 11, computing system 1110 may include a memory controller 1118, an input/output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller 1118 may perform and/or be a means for performing, either alone or in combination with other elements, one or more of the steps or features described and/or illustrated herein, such as providing, determining, executing, setting, reading, altering, denying, permitting, and/or enforcing.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing, either alone or in combination with other elements, one or more of the providing, determining, executing, setting, reading, altering, denying, permitting, and/or enforcing steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the providing, determining, executing, setting, reading, altering, denying, permitting, and/or enforcing steps disclosed herein. Communication interface 1122 may also be used to perform and/or be a means for performing other steps and features set forth in the instant disclosure.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the providing, determining, executing, setting, reading, altering, denying, permitting, and/or enforcing steps disclosed herein. Input device 1128 may also be used to perform and/or be a means for performing other steps and features set forth in the instant disclosure.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110. In one example, databases 120 from FIG. 1 may be stored in primary storage device 1132.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

In certain embodiments, storage devices 1132 and 1133 may be used, for example, to perform and/or be a means for performing, either alone or in combination with other elements, one or more of the providing, determining, executing, setting, reading, altering, denying, permitting, and/or enforcing steps disclosed herein. Storage devices 1132 and 1133 may also be used to perform and/or be a means for performing other steps and features set forth in the instant disclosure.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

Figure 12:
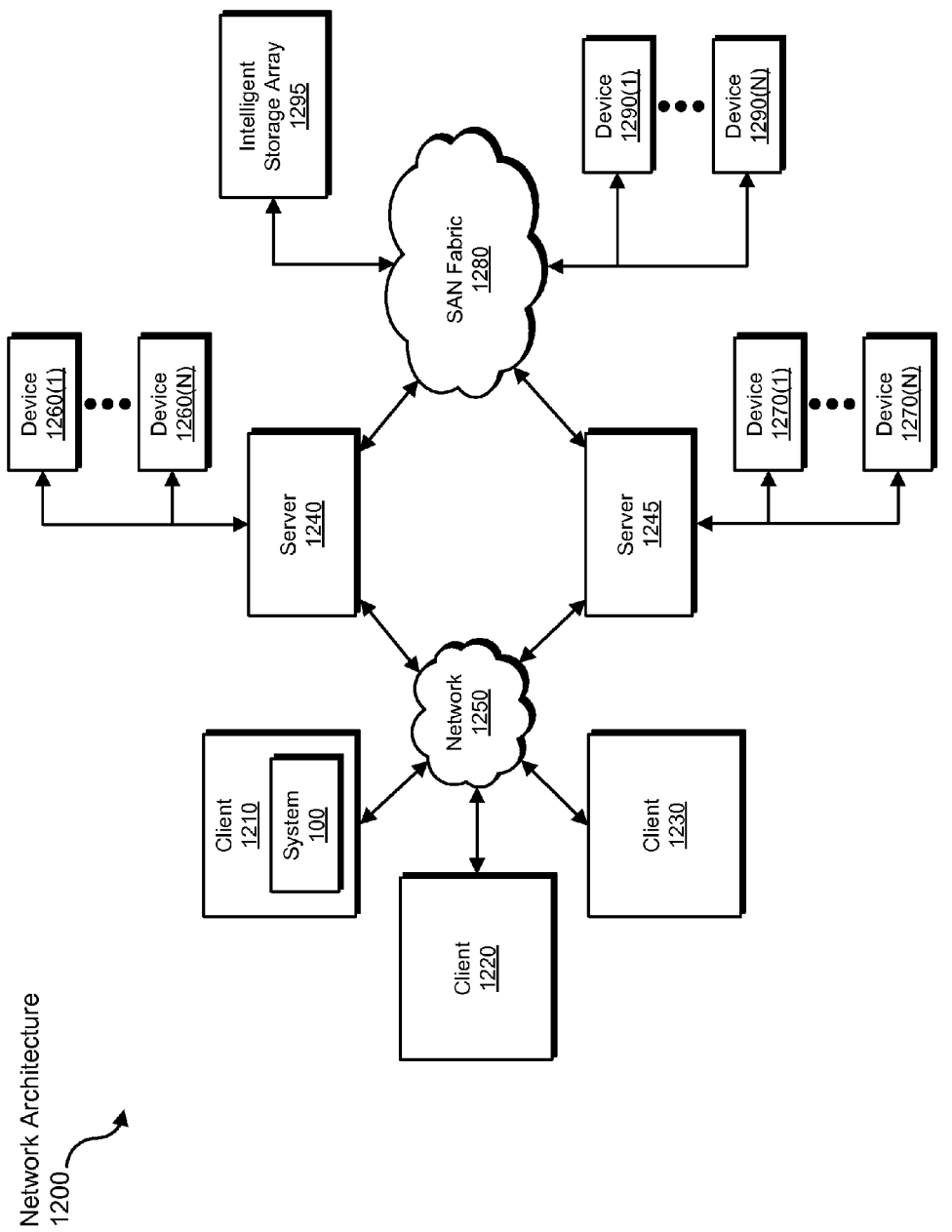
FIG. 12 is a block diagram of an exemplary computing network capable of implementing one or more of the embodiments described and/or illustrated herein.

FIG. 12 is a block diagram of an exemplary network architecture 1200 in which client systems 1210, 1220, and 1230 and servers 1240 and 1245 may be coupled to a network 1250. Client systems 1210, 1220, and 1230 generally represent any type or form of computing device or system, such as exemplary computing system 1110 in FIG. 11. In one example, client system 1210 may include system 100 from FIG. 1.

Similarly, servers 1240 and 1245 generally represent computing devices or systems, such as application servers or database servers, configured to provide various database services and/or run certain software applications. Network 1250 generally represents any telecommunication or computer network including, for example, an intranet, a wide area network (WAN), a local area network (LAN), a personal area network (PAN), or the Internet.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent network-attached storage (NAS) devices configured to communicate with servers 1240 and 1245 using various protocols, such as NFS, SMB, or CIFS.

Servers 1240 and 1245 may also be connected to a storage area network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250. Accordingly, network architecture 1200 may perform and/or be a means for performing, either alone or in combination with other elements, one or more of the providing, determining, executing, setting, reading, altering, denying, permitting, and/or enforcing steps disclosed herein. Network architecture 1200 may also be used to perform and/or be a means for performing other steps and features set forth in the instant disclosure.

As detailed above, computing system 1110 and/or one or more components of network architecture 1200 may perform and/or be a means for performing, either alone or in combination with other elements, one or more steps of an exemplary method for protecting networks from infected computing devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, access control module may transform a network access control policy from a first security policy to a second more limiting security policy at a computing system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting networks from infected computing devices, at least a portion of the method being performed by a computing device comprising at least one processor, the method comprising:
   providing a computing system with a first level of access to a network, the computing system being managed by an endpoint management system that controls the computing system's access to the network;
   determining that the computing system is infected with malware by performing one of:
   detecting diminished system performance without detecting explicit evidence of malware;
   detecting explicit evidence of malware;
   determining that the computing system cannot autonomously neutralize the malware at least in part by:
   periodically checking, by the endpoint management system, a flag to determine whether the computing system is infected with malware;
   executing software by the computing device in an attempt to autonomously neutralize the malware;
   setting the flag by the computing device indicating that the attempt by the software to autonomously neutralize the malware failed;
   reading the flag by the endpoint management system and determining that the flag is set;
   in response to the determining that the computing system cannot autonomously neutralize the malware, modifying by the endpoint management system a network access control policy to alter the computing system's first level of access to the network to a second level of access to the network, the second level providing more limited access to the network than the first level.

2. The method according to claim 1, wherein the diminished system performance comprises a slowing of processing by the computing system.

3. The method according to claim 1, wherein
the explicit evidence of malware comprises a hash of a file on the computing system that matches a hash of a known malware file.

4. The method according to claim 1, wherein:
altering the computing system's first level of access to the network to the second level of access to the network comprises transmitting a firewall policy to the computing system;
modifying the network access control policy comprises enforcing the firewall policy.

5. The method according to claim 4, wherein enforcing the firewall policy comprises denying all incoming and outgoing connections to the computing system except a connection with the endpoint management system.

6. The method according to claim 5, wherein enforcing the firewall policy comprises permitting a connection for downloading updated anti-malware definitions from the endpoint management system.

7. The method according to claim 5, wherein enforcing the firewall policy comprises permitting a connection for reporting the health of the computing system to the endpoint management system.

8. The method according to claim 4, wherein the firewall policy does not permit any application that attempts to access system files of the computing system to access the files.

9. The method according to claim 4, wherein the firewall policy does not permit the computing system to access a removable device locally attached to the computing system.

10. The method according to claim 4, wherein the endpoint management system enforces the firewall policy at the computing system until the malware is neutralized.

11. A system for protecting networks from infected computing devices, the system comprising:
an access control module programmed to provide a computing system with a first level of access to a network, the computing system being managed by an endpoint management system that controls the computing system's access to the network;
a determining module programmed to determine:
that the computing system is infected with malware by performing one of:
detecting diminished system performance without detecting explicit evidence of malware;
detecting explicit evidence of malware;
that the computing system cannot autonomously neutralize the malware at least in part by:
periodically checking, by the endpoint management system, a flag to determine whether the computing system is infected with malware;
executing software by a computing device in an attempt to autonomously neutralize the malware;
setting the flag by the computing device indicating that the attempt by the software to autonomously neutralize the malware failed;
reading the flag by the endpoint management system and determining that the flag is set;
wherein the access control module is further programmed to, in response to the determining that the computing system cannot autonomously neutralize the malware, modify a network access control policy to alter the computing system's first level of access to the network to a second level of access to the network, the second level providing more limited access to the network than the first level;
a physical processor configured to execute at least one of the access control module and the determining module.

12. The system according to claim 11, wherein the diminished system performance comprises a slowing of processing by the computing system.

13. The system according to claim 11, wherein the explicit evidence of malware comprises a hash of a file on the computing system that matches a hash of a known malware file.

14. The system according to claim 11, wherein:
the access control module is programmed to alter the computing system's first level of access to the network to the second level of access to the network by transmitting a firewall policy to the computing system;
the access control module is programmed to modify the network access control policy by enforcing the firewall policy.

15. The system according to claim 14, wherein the access control module is programmed to enforce the firewall policy at least in part by denying all incoming and outgoing connections to the computing system except that a connection with the endpoint management system is permissible.

16. The system according to claim 15, wherein the access control module is programmed to enforce the firewall policy at least in part by permitting a connection for downloading updated anti-malware definitions from the endpoint management system.

17. The system according to claim 15, wherein the access control module is programmed to enforce the firewall policy at least in part by permitting a connection for reporting the health of the computing system to the endpoint management system.

18. The system according to claim 14, wherein the firewall policy does not permit any application that attempts to access system files of the computing system to access the files.

19. The system according to claim 14, wherein the firewall policy does not permit the computing system to access a removable device locally attached to the computing system.

20. A non-transitory computer-readable-storage medium comprising one or more computer-executable instructions that, when executed by at least one processor of a computing device, cause the computing device to:
provide a computing system with a first level of access to a network, the computing system being managed by an endpoint management system that controls the computing system's access to the network;
determine that the computing system is infected with malware by performing one of:
detecting diminished system performance without detecting explicit evidence of malware;
detecting explicit evidence of malware;
determine that the computing system cannot autonomously neutralize the malware at least in part by:
periodically checking, by the endpoint management system, a flag to determine whether the computing system is infected with malware;
executing software by the computing device in an attempt to autonomously neutralize the malware;
setting the flag by the computing device indicating that the attempt by the software to autonomously neutralize the malware failed;
reading the flag by the endpoint management system and determining that the flag is set;
in response to the determining that the computing system cannot autonomously neutralize the malware, modify by the endpoint management system a network access control policy to alter the computing system's first level of access to the network to a second level of access to the network, the second level providing more limited access to the first level.

* * * * *